Nov. 1, 1966    G. D. JONES ET AL    3,282,157
COLOR REVERSIBLE ELECTROCHEMICAL LIGHT
FILTER UTILIZING ELECTROLYTIC SOLUTION
Filed Jan. 7, 1963
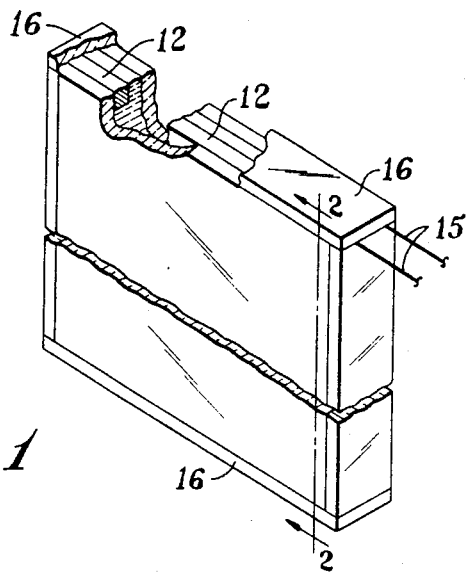
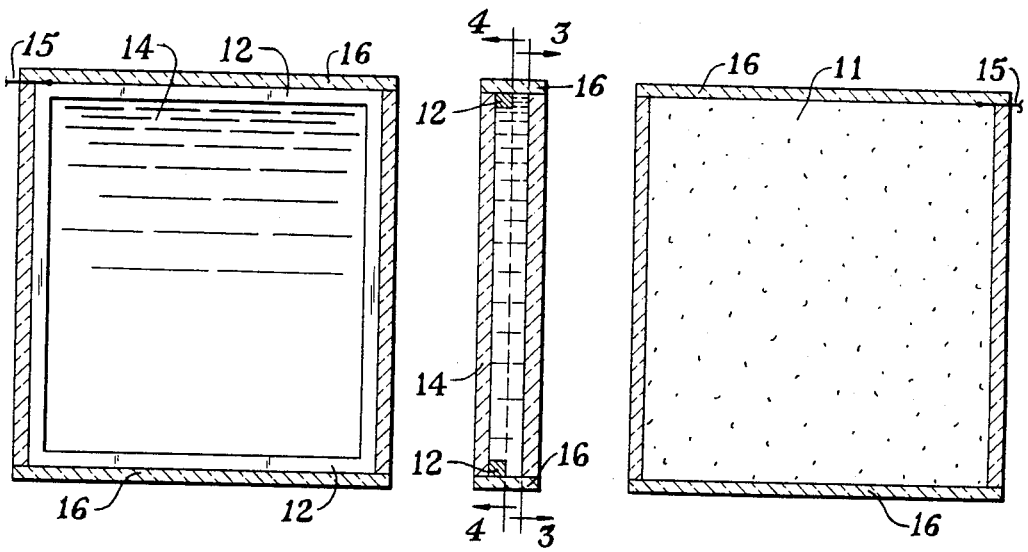
INVENTORS.
Giffin D. Jones
Ralph E. Friedrich
BY Griswold & Burdick
ATTORNEYS

United States Patent Office 3,282,157
Patented Nov. 1, 1966

3,282,157
COLOR REVERSIBLE ELECTROCHEMICAL LIGHT FILTER UTILIZING ELECTROLYTIC SOLUTION
Giffin D. Jones and Ralph E. Friedrich, Midland, Mich., assignors to The Dow Chemical Company, Midland, Mich., a corporation of Delaware
Filed Jan. 7, 1963, Ser. No. 249,858
3 Claims. (Cl. 88—107)

This invention relates to an improved electrochemical, substantially transparent, light filter the color of which may be reversibly altered upon the appropriate application of electric current.

Tinted or colored glass has found wide acceptance and applicability. It is useful in situations where direct sun or other light is harmful or undesirable. In such situations, the tinted or colored glass may filter out a portion of the light or simply reduce its intensity. Usually, the incident light is undesirably intense only during certain periods of the day. In this situation, it is desirable that the glass be clear or nearly clear at least a part of the time. Eastern exposure windows, for example, would desirably be tinted in the morning and clear during the afternoon. For western exposure windows, of course, the reverse could be true.

Numerous attempts have been made to provide light filters of variable absorption. One such attempt is disclosed in U.S. Patent 2,710,274. That patent discloses a method wherein a substantially transparent sandwich of two outside layers of glass and a middle layer of a material whose transparency changes with luminous intensity and/or temperature. These filters have the apparent disadvantage of being dependent on luminous intensity and/or temperature and, to that extent, are not subject to positive control of light transmission.

Other proposed methods of providing a variable intensity light filter include (as suggested in U.S. Patent 2,953,819) the orientation of small particles contained in a liquid by means of an electric field, thereby altering the transmission of light through the liquid. A method is suggested in British Patent 328,017 wherein a clear solution is caused to develop a color as long as electric current is passed therethrough, the color disappearing and the solution clarifying immediately upon termination of the current. Similarly, in U.S. Patent 2,632,045, an electrochemical color filter is suggested in which the intensity of the color is proportional to the voltage applied thereto. As the potential is decreased, the solution in the filter reverts to its original (usually clear) state.

None of the above methods succeed in a color change which will remain as long as desired without the continuous application of current to the solution in the filter.

We have discovered an electrochemical light filter, the color of which may be reversibly altered and, once formed, will remain over a substantial period of time without further application of electric current thereto.

A better understanding of the present invention together with its attendant objects and advantages will be facilitated by the following specification when taken in conjunction with the accompanying drawings in which:

FIGURE 1 is an isometric view partially in section of one embodiment of the filter of the present invention.

FIGURE 2 is a sectioned plan view of the filter of the present invention.

FIGURE 3 is a sectional view of the filter of the present invention which illustrates in more detail the transparent gross electrode.

FIGURE 4 is a sectional view of the filter of the present invention which illustrates in more detail the minor electrode.

In the embodiment illustrated in the drawings, one major internal surface 11 of the filter is treated so as to make a major portion of that side electrically conductive without destroying transparency. A relatively small, inert conductive electrode surface 12 is provided within the filter. In the embodiment illustrated, the electrode surface 12 is in the form of a peripheral strip around the outer edge of major internal surface 14 of the filter. Other configurations are, of course, possible and may also be desirable. Each electrode is provided with means, such as wires 15, to connect an external source of direct current. Sealing means 16 is generally employed to protect the solution from contact with air and to prevent spillage in handling and use.

The filter may be constructed of glass, suitable plastics or any other substantially transparent material which is impervious to the aqueous solution to be retained within the body of the filter. Desirably, the transparent material has chararacteristics which will permit its use as a structural member as, for example, in interior or exterior window glass fixtures.

Ordinarily, the transparent gross electrode will preferably cover the entire surface of one major internal surface of the filter. Suitable materials for forming this transparent electrode are stannic or indium oxide, a light metallized coating or a metallic screen of particles sufficiently small that substantial transparency is maintained. The minor, preferably inert, electrode need not be transparent. Silver, platinum, chromium, nickel, tungsten, calomel, or wires coated with these materials or the like may be used, depending on the solution to be contained in the article.

Appropriate aqueous, light transmitting solutions for use in the filter of the present invention are those containing complexed ions of manganese. Other ions permissible in the aqueous solutions useful in the filter of the present invention are those which do not form precipitates with either the complexed or the uncomplexed manganese ions and are not readily oxidized or reduced. Examples of other ions permissible in the aqueous solua- are: sodium, lithium, potassium, ammonium, hydrogen, magnesium, chloride, sulfate, nitrate, acid phosphate and the like which exhibit the requisite characteristics outlined above.

Suitable complexing materials for use in the present invention are those which render manganese ion stable in aqueous solution in both a $+2$ and $+3$ valence state. Cyanides such as, for example, sodium, potassium, hydrogen, lithium, and ammonium cyanides, and the like, and thio compounds, such as, for example ,thiourea, methylolthiourea, dimethylthiourea, diethylthiourea, ammonium, sodium, potassium, lithium thiocyanates and the like, are appropriate complexing agents for manganese in accordance with the present invention.

Generally, the pH of the solution is maintained at 7 or below in order to insure solubility of both complexed and uncomplexed manganese ion. Higher pH may be used if sufficient complexing agent is employed to insure the solubility of manganese ion at the desired pH.

Manganese ion may be present in the aqueous solution at concentrations from about 0.1 percent by weight of solution to the solubility limit in water. Complexing agent must be present in an amount sufficient to complex manganese ion present in an amount equal to at least 0.1 percent by weight of solution. Lower amounts of manganese ion may result in weaker color and are thus not usually to be preferred.

Voltage applied between the electrodes should be sufficient to cause current flow, but should be below the gassing limit of the particular cell used. The electrode-electrolyte voltage should be below the accepted decomposition potential (about 2.2 volts). Total voltage applied to the electrodes will, of course, take into account the conductivity of the electrolyte solution and the cell geometry. For instance, if the voltage drop across the electrolyte in the particular cell to be used were one volt, and three volts were applied between electrodes, the electrode-electroylte voltage would be two volts and thus below the 2.2 volt gassing limit.

In some instances, it may be desirable to mix into the solution a freezing point depressant. Further, in some applications the addition of a gelling agent may be desirable, mainly to prevent leakage. None of these are essential. The use of these additives such as an anti-freeze or a gelling agent, should be considered in light of the particular metal-containing ions contained in the solution. Some alcohols may react with the ion in solution and would thus be undesirable. Tertiary alcohols, however, and particularly tertiary-butyl alcohol, as well as recognized soluble inorganic freezing point depressants, are generally useful as anti-freeze additives in the present invention.

A wide variety of gelling agents such as sulfonated polyvinyl aromatics, polymers of sulfonated aromatic monomers, polyvinyltrimethylammonium chloride, hydrolyzed polyisopropenyl acetate, or the like may also be employed, if desired.

Maximum color stability may be obtained by protecting the solution from contact with air. When the solution is so-protected, color formed by the passage of current through the solution will usually remain for at least several hours or until a current is passed through the solution in the reverse direction.

The present invention may be more readily understood in light of the following example which is set forth to illustrate, and is not to be construed to limit, this invention.

Example

A glass cell was constructed substantially as hereinbefore described having a one-inch square transparent gross electrode of glass coated with tin oxide and a minor electrode of silver.

An aqueous solution of about 0.5 gram manganese sulfate in about 99 grams of water was prepared and its pH adjusted to about 4 with sulfuric acid after adding sufficient (about 12 grams) ammonium thiocyanate to give a definite pink color. The pink solution was used to fill the cell described above, the cell was sealed, and the conducting glass electrode of the cell was made the anode. As current was passed through the solution, its color turned from pink to deep red. Standing for several hours at no current flow resulted in no observable change in the color of the solution. Reversal of electrode polarity and subsequent flow of current through the solution caused the color of the solution to return to pink.

In a manner similar to that of the foregoing example, sodium, potassium, hydrogen or ammonium cyanide, thiourea, dimethylthiourea, diethylthiourea, or sodium, potassium or lithium thiocyanate may be substituted for the ammonium thiocyanate specifically shown with similar results.

Various modifications may be made in the present invention and it is to be understood that we limit ourselves only as defined in the appended claims.

We claim:

1. In an electrochemical light filter having a transparent gross electrode, a minor electrode in spaced relationship to the gross electrode and which is spaced and positioned to allow the passage of light, a light transmitting electrolyte occupying the space between said electrodes, an electrical power source and means for reversibly applying such electrical power to the electrodes, the improvement which comprises providing as said electrolyte an aqueous solution containing a coloring amount of complexed manganese ion stable in aqueous solution in the $+2$ and $+3$ valence state whereby the color of the aqueous solution is altered by sequentially applying pulses of electrical power of opposite polarity.

2. The electrochemical light filter of claim 1 wherein the amount of complexed manganese ion is from about 0.1 percent by weight of solution up to the solubility limit of the manganese ion in the aqueous solution.

3. The electrochemical light filter of claim 1 wherein the complexing agent is ammonium thiocyanate.

References Cited by the Examiner

UNITED STATES PATENTS

| 2,632,045 | 3/1953 | Sziklai | 88—107 X |
| 2,710,274 | 6/1955 | Kuehl. | |
| 2,953,819 | 9/1960 | Holoubek et al. | 106—291 X |

FOREIGN PATENTS

| 328,017 | 4/1930 | Great Britain. |

DAVID H. RUBIN, Primary Examiner.

J. G. BOLTEN, Assistant Examiner.